United States Patent
Stechman, Jr. et al.

(10) Patent No.: US 6,397,580 B1
(45) Date of Patent: Jun. 4, 2002

(54) HIGH PERFORMANCE ROCKET ENGINE HAVING A STEPPED EXPANSION COMBUSTION CHAMBER AND METHOD OF MAKING THE SAME

(75) Inventors: Rupert C. Stechman, Jr., Northridge; Peter E. Woll, santa Clarita; Joel M. Neiderman, Agoura Hills; Jeffrey J. Jensen, Reseda, all of CA (US)

(73) Assignee: Bi-Propellant Rocket Research Corporation, Redmond, WA (US)

( * ) Notice: Subject to any disclaimer, the term of this patent is extended or adjusted under 35 U.S.C. 154(b) by 0 days.

(21) Appl. No.: 09/112,390

(22) Filed: Jul. 9, 1998

(51) Int. Cl.$^7$ .................................................. F02K 9/42
(52) U.S. Cl. .............................. 60/258; 60/204; 60/265
(58) Field of Search ........................ 60/257, 258, 265, 60/204

(56) References Cited

U.S. PATENT DOCUMENTS

| | | | |
|---|---|---|---|
| 3,439,502 A | * | 4/1969 | Lee .............................. 60/258 |
| 3,439,503 A | * | 4/1969 | Friedman et al. ............. 60/258 |
| 4,882,904 A | * | 11/1989 | Schoenman ................... 60/258 |
| 4,936,091 A | * | 6/1990 | Schoenman ................... 60/258 |
| 6,079,100 A | | 6/2000 | Kreiner et al. |
| 6,138,450 A | | 10/2000 | Kreiner et al. |
| 6,138,451 A | | 10/2000 | Kreiner et al. |

* cited by examiner

Primary Examiner—Charles G. Freay
(74) Attorney, Agent, or Firm—Chester E. Crone; Christensen O'Conner Johnson Kindess PLLC (57) ABSTRACT

An improved rocket engine combustion chamber design wherein a first or precombustion chamber having a first diameter is located intermediate to a propellant injector and a second or main combustion chamber having a second diameter which is larger than the first diameter. The combustion chamber extends radially outwardly from the first diameter to the second diameter suddenly at the intersection between the precombustion chamber and the main combustion chamber. Film cooling is provided by providing a stratified layer of low temperature fluid adjacent to the inner wall of the precombustion chamber and surrounding a primary inner core of high temperature gases. The sudden stepped expansion at the interface between the precombustion chamber and the main combustion chamber provides secondary recirculation mixing of the propellants and will complete combustion between the main hot gas core and the propellant film cooling layer. In an additional aspect, the inner surface of the precombustion chamber may be made of a material which has a high degree of thermal conductivity to minimize temperature gradients.

34 Claims, 1 Drawing Sheet

Fig. 3

HIGH PERFORMANCE ROCKET ENGINE HAVING A STEPPED EXPANSION COMBUSTION CHAMBER AND METHOD OF MAKING THE SAME

BACKGROUND OF THE INVENTION

FIELD OF THE INVENTION

The present invention relates generally to the field of rocket engines, and more particularly to an improved rocket engine combustion chamber design and method of making the same wherein the combustion chamber has a first smaller diameter film cooled surface portion adjacent to a propellant injector and steps suddenly outward to a second larger diameter portion at a position spaced away from the propellant injector, wherein the film cooling together with the sudden expansion of the diameter of the combustion chamber result in an exceptionally high degree of combustion efficiency.

The field of rocket science has advanced rapidly during the latter half of the twentieth century from its relatively primitive beginnings. Early rockets were essentially experimental, pilotless aircraft which were operated by crude control systems. The tremendous technological advances in rocket propulsion have been accompanied by similar advances in other essential fields such as electronics, inertial guidance and control systems, aerodynamics, and material sciences. As a result, rockets today are manufactured for a variety of purposes, ranging from military applications to carrying scientific instruments for use in gathering information at high altitudes, either within or above the earth's atmosphere.

While such rockets may vary considerably both in application as well as size, they all include three essential components: a mission payload which is to be carried by the rocket, a guidance and control system, and a power source for propelling them. The first of these components is the guidance and control system, which controls the flight path of the rocket. The second of the aforementioned components is the mission payload, which, as mentioned above, may vary widely, varying from scientific instruments, to surveillance equipment, to explosive warheads.

It is the third of the three essential components of a rocket, namely the power source, which is the focus of the present invention. This power source is typically a self-contained rocket engine. Three different types of rocket engines have been predominantly utilized in the past, namely solid propellant systems, liquid bipropellant systems, and liquid or gaseous monopropellant systems. Solid propellant systems present several significant disadvantages not found in liquid bipropellant and monopropellant systems. For example, solid propellant systems are relatively heavy, have lower attainable exhaust velocities, and offer poor control of operating level in flight (throttleability).

Liquid bipropellant systems use an oxidizer and a fuel which are tanked separately and mixed in the combustion chamber. Typically, such liquid bipropellant systems use hydrazine or monomethylhydrazine as the fuel, and nitrogen tetroxide as the oxidizer. In some applications, bipropellant systems use gels instead of liquids. Liquid monopropellant systems typically also use hydrazine as a monopropellant fuel. Since liquid bipropellant systems are more widely used, the discussion which follows focuses on such systems.

The typical components of a liquid bipropellant propulsion system are the rocket engine, fuel tanks, and a vehicle structure to maintain these parts in place and connect them to the mission payload. The liquid bipropellant rocket engine itself consists of a main chamber for mixing and burning the fuel and the oxidizer, with the fore end occupied by fuel and oxidizer manifolds and injectors and the aft end comprising a nozzle. The oxidizer and the fuel are transferred from their respective tanks by pumps or may be pressurized by gas and are supplied to the injector manifold at a high pressure. The oxidizer and the fuel are then injected into the combustion chamber in a manner that assures atomization and mixing so that they may be efficiently reacted to produce thrust from the rocket engine.

Two problems which must be faced in the implementation of a rocket engine design are maximizing the efficiency of combustion and dealing with the problem of heat in the rocket engine. It will at once be appreciated by those skilled in the art that it is desirable to have a combustion efficiency approaching as close as possible to 100 percent. In addition, those skilled in the art will also realize that the hot gas chemical and temperature environment of a rocket engine, if left unchecked, may damage or destroy the combustion chamber during the desired lifetime of the rocket engine (which is typically in the range of 35,000–100,000 seconds).

The main combustion chamber of larger rocket engines typically use regenerative propellant cooling, in which the combustion chamber includes a coolant jacket through which liquid propellant (usually fuel) is circulated at rates high enough to allow the rocket engine to operate continuously without an excessive increase in the combustion chamber wall temperature. Smaller rocket engines instead use direct rejection of heat from the combustion chamber to the space environment by radiation heat transfer.

Effective cooling of a liquid rocket engine in the thrust range of 1 Newton to 10,000 Newtons is typically accomplished by using liquid or gaseous film cooling of the combustion chamber wall which establishes a stratified layer of low temperature fluid adjacent to the inner wall of the combustion chamber. This is accomplished by establishing a film cooling injection pattern and a main core injection pattern wherein the injectors provide a primary inner core of high temperature gases and a peripheral layer of low temperature unmixed and partially mixed propellant gases. The unmixed propellant used for the film cooling and partially mixed propellants must then be reacted in a rapid and efficient manner in order to provide a maximum specific impulse efficiency rocket engine.

Several patents which are relevant to the present invention may be reviewed as background information. These patents are U.S. Pat. No. 3,074,469, to Babbitt et al, U.S. Pat. No. 4,785,748, to Sujata et al., U.S. Pat. No. 4,915,038, also to Sujata et al., all of which are assigned to the assignee of the present invention, as well as U.S. Pat. No. 4,882,904, to Schoenman, and U.S. Pat. No. 4,936,091, also to Schoenman. U.S. Pat. No. 3,074,469, U.S. Pat. No. 4,785,748, U.S. Pat. No. 4,882,904, U.S. Pat. No. 4,915,038, and U.S. Pat. No. 4,936,091 are each hereby incorporated herein by reference.

It is accordingly one of the principal objectives of the present invention that it result in a rocket engine having a design and method of manufacture which provide a highly effective cooling mechanism which protects the combustion chamber from damage or destruction caused by high temperature conditions. It is a further objective of the present invention that it minimize or eliminate the reactions that take place between the incompletely reacted fuel and oxidizer products and the combustion chamber wall materials. It is a related objective of the present invention that it optimize the temperature gradients between the various components of the rocket engine to provide effective cooling and minimize structural and thermal stresses.

It is another of the principal advantages of the present invention that it enhance the combustion efficiency of the rocket engine to the maximum degree possible. It is accordingly an objective of the present invention that the rocket engine combustion chamber be of a design which promotes a complete mixing of the propellants such that they may be completely reacted within the combustion chamber. It is a related objective of the present invention that mixing of the main core of gas with the film cooling layer is accomplished after the need for the film cooling layer is no longer required, but before the unmixed and unreacted propellants leave the combustion chamber.

The stepped expansion combustion chamber rocket engine of the present invention must be of a construction which is both durable and long lasting, and it must also require no maintenance to be provided by the user throughout its operating lifetime. In order to enhance the market appeal of the stepped expansion combustion chamber rocket engine of the present invention, it should also be of relatively inexpensive construction to thereby afford it the broadest possible market. Finally, it is also an objective that all of the aforesaid advantages and objectives of the stepped expansion combustion chamber rocket engine of the present invention be achieved without incurring any substantial relative disadvantage.

SUMMARY OF THE INVENTION

The disadvantages and limitations of the background art discussed above are overcome by the present invention. With this invention, three key aspects are incorporated into the design of a rocket engine combustion chamber. The first two of these three key aspects are the use of film cooling and a stepped expansion combustion chamber, which together provide the heretofore mutually exclusive benefits of effective cooling of the combustion chamber and superior mixing of the fuel and oxidizer resulting in highly efficient combustion.

The combustion chamber thus consists of two portions, namely a first portion referred to herein as a precombustion chamber and a second portion referred to herein as a main combustion chamber. The precombustion chamber has a first diameter, and is located intermediate to the injector manifold assembly and the main combustion chamber, the latter of which has a second diameter larger than the first diameter. The precombustion chamber and the main combustion chamber are coaxial and adjacent to each other, such that the combustion chamber extends radially outward from the first diameter to the second diameter at the intersection between the precombustion chamber and the main combustion chamber in a step-wise manner. This construction is the derivation of the reference to a "stepped" combustion chamber.

The convergent throat and exhaust nozzle sections of the rocket engine form the remainder of the rocket engine. This section is formed in one single continuous assembly and is connected to the main combustion chamber at the end opposite the precombustion chamber.

The injector manifold assembly contains fuel and oxidizer manifolds which are located therein, as well as injectors communicating between the respective fuel and oxidizer manifolds and the interior of the stepped combustion chamber. The fuel manifold will be supplied with pressurized fuel, while the oxidizer manifold will be supplied with pressurized oxidizer. The injectors establish two spray patterns into the stepped combustion chamber, namely a main core injection pattern and a film cooling pattern. The main core injection pattern will provide a primary inner core of well mixed, high temperature combusting gases, while the film cooling pattern will provide an annular peripheral layer of low temperature unmixed and partially mixed propellant gases immediately adjacent to the interior surface of the precombustion chamber.

It will therefore be appreciated by those skilled in the art that only the injector manifold assembly and the precombustion chamber come in contact with the oxidizer and fuel and partially reacted combustion products at low temperatures. The precombustion chamber is effectively cooled by film cooling, and the sudden expansion process effectively mixes the remaining fuel and oxidizer, allowing them to combust completely. The injector manifold assembly and the precombustion chamber come in contact with the oxidizer and fuel, partially reacted combustion products, and, in some cases, decomposing fuel, but only at relatively low temperatures. The larger diameter main combustion chamber is subjected to higher temperatures, but only in the presence of the fully combusted propellants. Thus, the entire stepped expansion combustion chamber of the rocket engine of the present invention is protected from being simultaneously exposed to both corrosive partially reacted combustion products and high temperatures.

The use of the sudden expansion design in the stepped expansion combustion chamber of the rocket engine of the present invention also enhances the combustion efficiency by promoting mixing of the main core of gas with the film layer after the need for the cooling effect provided by the film layer is no longer required. The sudden expansion design is also effective in providing a flame-holding and recirculation zone to increase the chamber residence time of the unreacted and partially reacted gases. The resultant momentum of the main core gases is designed to impinge on the precombustion chamber wall just prior to the sudden change in diameter of the combustion chamber. The mixed core and film is thus effectively reacted in the recirculation zone which results from the sudden dimensional expansion.

The third key aspect of the stepped expansion combustion chamber rocket engine of the present invention is the use of a material for the inner surface of the precombustion chamber which has a high degree of thermal conductivity. The use of a material having a relatively high thermal conductivity for the precombustion chamber will serve to minimize the wall axial and circumferential temperature gradient between the portion of the combustion chamber at which the sudden expansion occurs and the face of the injector manifold assembly. The use of moderate amounts of propellant as a film coolant effectively cools the injector manifold assembly and eliminates the need for thermal isolation of the injector manifold assembly and the combustion chamber.

The use of a material for the inner surface of the precombustion chamber which has a high degree of thermal conductivity may be facilitated in two ways. First, the precombustion chamber itself may be made of a material having a high degree of thermal conductivity. Alternately, an inner precombustion chamber liner made of a material having a high degree of thermal conductivity may be used. The latter approach has an advantage in that the inner precombustion chamber liner can be fitted inside the precombustion chamber, with the precombustion chamber itself being made of a material which is better suited for assembly together with the injector manifold assembly and the main combustion chamber.

It may therefore be seen that the present invention creates a rocket engine having a design and method of manufacture which provide a highly effective cooling mechanism which protects the combustion chamber from damage or destruction caused by high temperature conditions. The present invention minimizes or eliminates the reactions that take place between the incompletely reacted fuel and oxidizer products and the combustion chamber wall materials. In a related aspect, the stepped expansion combustion chamber rocket engine of the present invention optimizes the temperature gradients between the various components of the rocket engine, thereby providing effective cooling and minimizing structural and thermal stresses.

The stepped expansion combustion chamber rocket engine of the present invention also enhances the combustion efficiency of the rocket engine to the maximum degree possible. The stepped expansion combustion chamber is of a design which promotes a complete mixing of the propellants such that they may be completely reacted within the combustion chamber. In the stepped expansion combustion chamber rocket engine of the present invention, mixing of the main core of gas with the film cooling layer is accomplished after the need for the film cooling layer is no longer required, but before the unmixed and unreacted propellants leave the combustion chamber.

The stepped expansion combustion chamber rocket engine of the present invention is of a construction which is both durable and long lasting, and which will require no maintenance to be provided by the user throughout its operating lifetime. The stepped expansion combustion chamber rocket engine of the present invention is also of relatively inexpensive construction to enhance its market appeal and to thereby afford it the broadest possible market. Finally, all of the aforesaid advantages and objectives of the stepped expansion combustion chamber rocket engine of the present invention are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENTS

Figure 1:
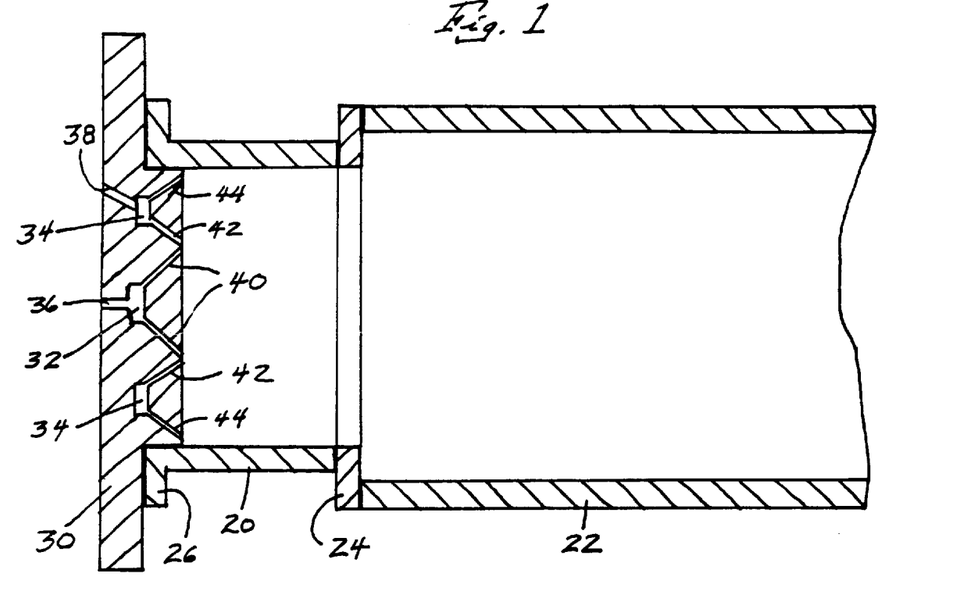
FIG. 1 is a somewhat schematic, cross-sectional view from the side of a stepped expansion combustion chamber constructed according to the teachings of the present invention, showing a plurality of injectors located in an injector manifold assembly, a smaller diameter precombustion chamber, and a larger diameter main combustion chamber.

The preferred embodiment of the stepped expansion combustion chamber rocket engine of the present invention is illustrated in FIG. 1, which shows the four principal components which together define the combustion chamber. A hollow essentially cylindrical precombustion chamber 20 having a first diameter is mounted onto a hollow essentially cylindrical main combustion chamber 22 having a second diameter which is larger than the first diameter using a washer-shaped annular step 24 which is located intermediate the precombustion chamber 20 and the main combustion chamber 22.

The inner diameter of the annular step 24 is the same as the inner diameter of the precombustion chamber 20, and the outer diameter of the annular step 24 is the same as the outer diameter of the main combustion chamber 22. The precombustion chamber 20 and the main combustion chamber 22 are thereby mounted into a single unit in coaxial fashion, preferably by welding, but by any method that ensures a leaktight connection such as brazing, swaging and explosive forming. The end of the precombustion chamber 20 extending away from the main combustion chamber 22 has a flange 26 which extends radially outwardly therefrom.

Mounted onto the flange 26 on the end of the precombustion chamber 20 extending away from the main combustion chamber 22 is an injector manifold assembly 30. The injector manifold assembly 30 is preferably mounted onto the precombustion chamber 20 by welding. A disc-shaped first manifold 32 is centrally located within the injector manifold assembly 30. An annular second manifold 34 is also located within the injector manifold assembly 30, with the second manifold 34 being spaced outwardly away from the first manifold 32. The first manifold 32 and the second manifold 34 are coaxial with each other and with the precombustion chamber 20 and the main combustion chamber 22.

A first propellant supply channel 36 will be used to supply a first propellant to the first manifold 32. Similarly, a second propellant supply channel 38 will be used to supply a second propellant to the second manifold 34. The first propellant supply channel 36 and the second propellant supply channel 38 will communicate with apparatus to supply first and second propellants, respectively, to the first manifold 32 and the second manifold 34, respectively. The first propellant supply channel 36 and the second propellant supply channel 38 thus communicate with the exterior of the injector manifold assembly 30 on the side of the injector manifold assembly 30 opposite the precombustion chamber 20 and the main combustion chamber 22.

A plurality of injector channels communicate between the first manifold 32 and the second manifold 34 and the side of the injector manifold assembly 30 facing inwardly into the precombustion chamber 20 and the main combustion chamber 22. Specifically, a plurality of first injector channels 40 extend in an outwardly conical frustrum shaped array from the first manifold 32 to the side of the injector manifold assembly 30 facing inwardly into the precombustion chamber 20 and the main combustion chamber 22. A plurality of second injector channels 42 extend in an inwardly conical frustrum shaped array from the first manifold 32 to the side of the injector manifold assembly 30 facing inwardly into the precombustion chamber 20 and the main combustion chamber 22.

The points at which the first injector channels 40 and the second injector channels 42 open into the precombustion chamber 20 form a roughly circular array of openings at approximately the midpoint of radii of the face of the injector manifold assembly 30 facing inwardly into the precombustion chamber 20 and the main combustion chamber 22. In this circular array, openings from the first injector channels 40 and the second injector channels 42 alternate to form a main core injector pattern. Multiple spray angles may be used if so desired. First and second propellants injected from the first injector channels 40 and the second injector channels 42, respectively, will mix well and provide a primary inner core of high temperature combusting gases.

A plurality of third injector channels 44 extend in an outwardly conical frustrum shaped array from the second manifold 34 to the side of the injector manifold assembly 30 facing inwardly into the precombustion chamber 20 and the main combustion chamber 22. The points at which the third injector channels 44 open into the precombustion chamber 20 form a roughly circular array of openings close to the intersection of the inner surface of the precombustion chamber 20 and the surface of the injector manifold assembly 30 which faces inwardly into the precombustion chamber 20 and the main combustion chamber 22. In this circular array, openings from the third injector channels 44 form a peripheral layer injection pattern.

This peripheral layer injection pattern of low temperature unmixed second propellant comprises the film cooling flow which will act to cool the inner surface of the precombustion chamber 20. This cylindrical film cooling layer will thus extend from the openings from the third injector channels 44 along the length of the precombustion chamber 20. Typically, the first propellant is the oxidizer and the second propellant, which is used for the film cooling flow, is the fuel. Thus, while the inner surface of the precombustion chamber 20 does come into contact to some extent with the oxidizer and fuel and with partially reacted combustion products, only relatively low temperatures exist at this inner surface of the precombustion chamber 20.

The sudden stepped expansion at the interface between the precombustion chamber 20 and the main combustion chamber 22 will provide secondary recirculation mixing of the propellants and will complete combustion between the main hot gas core created by the combustion of the propellants coming from the first injector channels 40 and the second injector channels 42 on the one hand and the propellant film cooling layer coming from the third injector channels 44 on the other hand. This complete combustion occurs near the entrance to the main combustion chamber 22, which is subjected to higher temperatures, but only in the presence of the fully combusted propellants.

Thus, both the precombustion chamber 20 and the main combustion chamber 22 are protected from being simultaneously exposed to both corrosive partially reacted combustion products and high temperatures. The stepped expansion combustion chamber of the rocket engine of the present invention greatly enhances the combustion efficiency by promoting mixing of the main core of gas with the film layer after the need for the cooling effect provided by the film layer is no longer required. Combustion efficiencies of over 99.6 percent have been obtained using the stepped expansion combustion chamber rocket engine of the present invention.

Use of this invention is applicable to, but not limited to, the following liquid and gaseous propellants: nitrogen tetroxide ($N_2O_4$) and mixtures of $N_2O_4$ containing nitric oxide (NO), red fuming nitric acid including all inhibitors, oxygen ($O_2$), ozone, fluorine and chlorine and compounds and mixtures thereof, hydrazine and all related compounds that include carbon and hydrogen radicals including monomethylhydrazine, air and mixtures thereof containing oxygen, unsymmetrical dimethylhydrazine and mixtures thereof, hydrogen, methane, ethanol, propane and related carbon/hydrogen and carbon/hydrogen/oxygen compounds.

Multiple materials may be used for the precombustion chamber 20, the main combustion chamber 22, the annular step 24, and the injector manifold assembly 30 to minimize stress loads resulting from differences in the thermal coefficients of expansion of materials. In the preferred embodiment, the precombustion chamber 20 is made of a material which has a high degree of thermal conductivity to minimize localized abnormally high heating rates and temperature gradients. Examples of such materials are the elements and alloys of nickel, platinum, rhodium, iridium, rhenium, beryllium, beryllium copper, and columbium (niobium). In the preferred embodiment, the main combustion chamber 22 is made of a material which is capable of withstanding high temperatures. Examples of such materials are the elements and alloys of rhenium, iridium platinum, rhodium, carbon, and silicon carbide.

Figure 2:
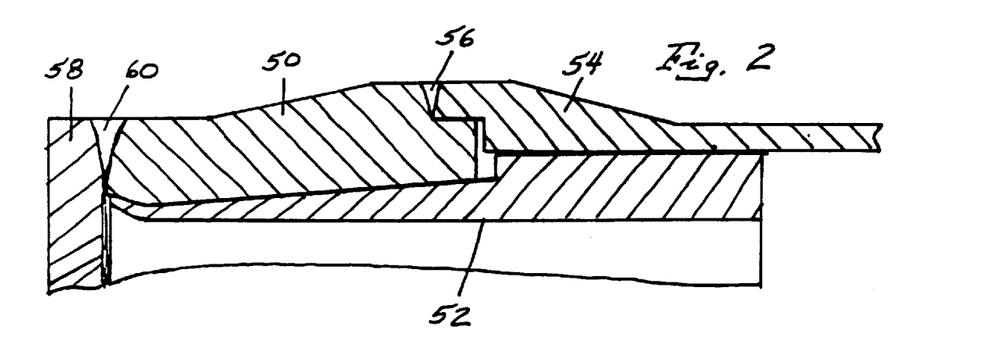
FIG. 2 is a cross-sectional view from the side of a portion of a stepped expansion combustion chamber also constructed according to the teachings of the present invention, showing an inner precombustion chamber liner made of a material having a high thermal conductivity being located within an outer precombustion chamber sleeve.

One problem which may occur in using a material which has a high degree of thermal conductivity is that it may be difficult or impossible to use a material for the precombustion chamber 20 that cannot be welded to the injector manifold assembly 30 or to the main combustion chamber 22 via the annular step 24 because of metallurgical incompatibility. It is, however, possible to use a material which has a high degree of thermal conductivity by cladding, diffusion bonding, brazing, alloying, or interference fitting it to another material that is capable of being welded to the injector manifold assembly 30 or to the main combustion chamber 22 via the annular step 24. Alternately, an interface material that provides minimum thermal contact resistance may be placed intermediate to the outer precombustion chamber sleeve 50 and the inner precombustion chamber liner 52 such that the interface material is re-melted or forced by a pressure load to displace any void between the outer precombustion chamber sleeve 50 and the inner precombustion chamber liner 52.

Referring next to FIG. 2, such a use of material which has a high degree of thermal conductivity is illustrated. A hollow essentially cylindrical outer precombustion chamber sleeve 50 is illustrated which has a hollow essentially cylindrical inner precombustion chamber liner 52 fixedly mounted therein. The inner precombustion chamber liner 52 is formed to be inserted into the outer precombustion chamber sleeve 50. Optionally, the outer diameter of the inner precombustion chamber liner 52 and the inner diameter of the outer precombustion chamber sleeve 50 may be tapered to fit together, as is shown in FIG. 2. The outer precombustion chamber sleeve 50 and the inner precombustion chamber liner 52 are assembled together using any of the aforementioned techniques.

A main combustion chamber 54 is mounted onto one end of the outer precombustion chamber sleeve 50 by a welded joint 56 therebetween. The inner diameter of the inner precombustion chamber liner 52 is smaller than the inner diameter of the main combustion chamber 54. The edge of the inner precombustion chamber liner 52 extends somewhat into the main combustion chamber 54, and forms a stepped expansion therein. An injector manifold assembly 58 is mounted onto the other end of the outer precombustion chamber sleeve 50 by a welded joint 60 therebetween.

The inner precombustion chamber liner 52 is made of a material which has a high degree of thermal conductivity but which cannot necessarily be welded to the main combustion chamber 54 or the injector manifold assembly 58. Examples of preferred materials for the inner precombustion chamber liner 52 include platinum, platinum alloys with rhodium, iridium alloys with rhodium, niobium, nickel alloys, cobalt alloys, carbon, carbon composites, and silicon carbide, all of which are capable of withstanding an operating temperature in excess of 2000° F.

Figure 3:
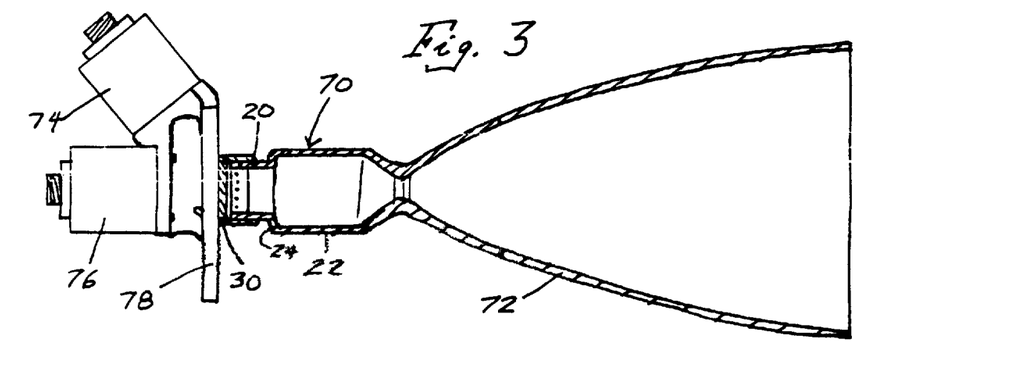
FIG. 3 is a partial cross-sectional view from the side of a rocket engine using the stepped expansion combustion chamber rocket engine of the present invention which is illustrated in FIG. 1.

Referring finally to FIG. 3, the combustion chamber illustrated in FIG. 1, which is identified by the reference numeral 70, is shown assembled together with several additional components to form the stepped expansion combustion chamber rocket engine of the present invention. A convergent section, throat and nozzle 72 is shown as being mounted on the open end of the main combustion chamber 22 of the combustion chamber 70. A first propellant valve 74 controls the flow of a first propellant to the combustion chamber 70, and a second propellant valve 76 controls the flow of a second propellant to the combustion chamber 70. Completing the construction is a mounting bracket 78 which may be used to mount the stepped expansion combustion chamber rocket engine of the present invention onto a rocket (not shown).

The capabilities and performance of the stepped expansion combustion chamber rocket engine of the present invention are quite impressive. The stepped expansion combustion chamber will operate at a level which is below the melting point of the material and at a material oxidation level that is consistent with operational times in the range of 35,000–40,000 seconds. The rocket engine will operate at any desired on and off times without overheating the rocket engine itself, the injectors, or the propellant valves. The stepped expansion combustion chamber rocket engine of the present invention is able to meet the specific stress margins required to prevent failure of the combustion chamber due to differences in the coefficients of thermal expansion of the materials and minimize radial and circumferential temperature gradients by using high thermal conductivity materials. All of this is attained while also achieving near theoretical specific impulse performance level.

It may therefore be appreciated from the above detailed description of the preferred embodiment of the present invention that it creates a rocket engine having a design and method of manufacture which provide a highly effective cooling mechanism which protects the combustion chamber from damage or destruction caused by high temperature conditions. The present invention minimizes or eliminates the reactions that take place between the incompletely reacted fuel and oxidizer products and the combustion chamber wall materials. In a related aspect, the stepped expansion combustion chamber rocket engine of the present invention optimizes the temperature gradients between the various components of the rocket engine, thereby providing effective cooling and minimizing structural and thermal stresses.

The stepped expansion combustion chamber rocket engine of the present invention also enhances the combustion efficiency of the rocket engine to the maximum degree possible. The stepped expansion combustion chamber is of a design which promotes a complete mixing of the propellants such that they may be completely reacted within the combustion chamber. In the stepped expansion combustion chamber rocket engine of the present invention, mixing of the main core of gas with the film cooling layer is accomplished after the need for the film cooling layer is no longer required, but before the unmixed and unreacted propellants leave the combustion chamber.

The stepped expansion combustion chamber rocket engine of the present invention is of a construction which is both durable and long lasting, and which will require no maintenance to be provided by the user throughout its operating lifetime. The stepped expansion combustion chamber rocket engine of the present invention is also of relatively inexpensive construction to enhance its market appeal and to thereby afford it the broadest possible market.

Finally, all of the aforesaid advantages and objectives of the stepped expansion combustion chamber rocket engine of the present invention are achieved without incurring any substantial relative disadvantage.

Although an exemplary embodiment of the stepped expansion combustion chamber rocket engine of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A rocket engine comprising:

a precombustion chamber having a first end and a second end, said precombustion chamber being defined by a peripheral wall extending between said first and second ends of said precombustion chamber and having a first inner diameter along a majority of said peripheral wall, said precombustion chamber being open at said first and second ends thereof;

a main combustion chamber having a first end and a second end, said main combustion chamber being defined by a peripheral wall extending between said first and second ends of said main combustion chamber and having a second inner diameter which is larger than said first inner diameter, said main combustion chamber being open at said first and second ends thereof;

an annular step interconnecting said second end of said precombustion chamber and said first end of said main combustion chamber into a combustion chamber assembly, said first end of said precombustion chamber and said second end of said main combustion chamber extending in opposite directions, the inner diameter of said combustion chamber assembly stepping suddenly outward from said first inner diameter in said precombustion chamber to said second inner diameter in said main combustion chamber at the location of said annular step; and an injector manifold assembly connected to said precombustion chamber at said first end thereof, said injector manifold assembly comprising a first plurality of injectors for directing a fuel and an oxidizer toward said main combustion chamber to form a propellant main core flow through said precombustion chamber, said injector manifold assembly further comprising a second plurality of injectors for directing at least one of the fuel and the oxidizer to form an annular peripheral cooling flow pattern adjacent to the interior surface of said precombustion chamber.

2. A rocket engine as defined in claim 1, wherein said precombustion chamber is of a hollow essentially cylindrical configuration having said first inner diameter.

3. A rocket engine as defined in claim 1, wherein at least the inner surface of said precombustion chamber is made of a material having a high degree of thermal conductivity.

4. A rocket engine as defined in claim 1, wherein said precombustion chamber is made of a material from the group consisting of the elements and alloys of nickel, platinum, rhodium, iridium, rhenium, beryllium, copper, and columbium.

5. A rocket engine as defined in claim 3, wherein said precombustion chamber comprises:

an outer precombustion chamber sleeve having a first end and a second end, said second end of said outer precombustion chamber sleeve being interconnected to said first end of said main combustion chamber, said first end of said outer precombustion chamber sleeve being connected to said injector manifold assembly; and an inner precombustion chamber liner located inside said outer precombustion chamber sleeve close adjacent to the inside of said outer precombustion chamber sleeve, the inside of said inner precombustion chamber liner defining said first inner diameter of said precombustion chamber, said inner precombustion chamber liner comprising said inner surface of said precombustion chamber.

6. A rocket engine as defined in claim 5, wherein said inner precombustion chamber liner is made of a material having a high degree of thermal conductivity.

7. A rocket engine as defined in claim 6, wherein said inner precombustion chamber liner is made of a material from the group consisting of platinum, platinum alloys with rhodium, iridium, iridium alloys with rhodium, niobium, nickel alloys, cobalt alloys, carbon, carbon composites, and silicon carbide.

8. A rocket engine as defined in claim 5, wherein a portion of said inner precombustion chamber liner extends partially into said main combustion chamber, said portion of said inner precombustion chamber liner which extends into said main combustion chamber ending abruptly to cause the inner diameter of said combustion chamber assembly to step suddenly from said first inner diameter in said inner precombustion chamber liner to said second inner diameter in said main combustion chamber.

9. A rocket engine as defined in claim 5, wherein said second end of said outer precombustion chamber sleeve, said annular step, and said first end of said main combustion chamber are joined together by one of the techniques from the group consisting of welding and brazing, and wherein said first end of said outer precombustion chamber sleeve is joined to said injector manifold assembly by one of the techniques from the group consisting of welding and brazing.

10. A rocket engine as defined in claim 5, wherein said inner precombustion chamber liner is installed inside said outer precombustion chamber sleeve by one of the techniques from the group consisting of cladding, diffusion bonding, brazing, alloying, interference fitting, swaging and explosive forming and bonding.

11. A rocket engine as defined in claim 5, wherein said inner precombustion chamber liner is installed inside said outer precombustion chamber sleeve by placing an interface material that provides minimum thermal contact resistance intermediate said inner precombustion chamber liner and said outer precombustion chamber sleeve such that said interface material is re-melted or forced by a pressure load to displace any void between said inner precombustion chamber liner and said outer precombustion chamber sleeve.

12. A rocket engine as defined in claim 5, wherein the outer diameter of said inner precombustion chamber liner and the inner diameter of said outer precombustion chamber sleeve are each tapered in similar fashion to fit together.

13. A rocket engine as defined in claim 1, wherein said main combustion chamber is of a hollow essentially cylindrical configuration having said second inner diameter.

14. A rocket engine as defined in claim 1, wherein said main combustion chamber is made of a material from the group consisting of the elements and alloys of rhenium, iridium platinum, rhodium, carbon, and silicon carbide.

15. A rocket engine as defined in claim 1, wherein said second end of said precombustion chamber is installed inside said first end of said main combustion chamber to thereby form said annular step.

16. A rocket engine as defined in claim 15, wherein said second end of said precombustion chamber is connected to said first end of said main combustion chamber by one of the techniques from the group consisting of welding and brazing.

17. A rocket engine as defined in claim 1, wherein said inner diameter of said combustion chamber is constant from said first end of said precombustion chamber to said second end of said precombustion chamber expansion.

18. A rocket engine as defined in claim 1, wherein said injector manifold assembly has first and second manifolds located therein, wherein one of said first and second manifolds is supplied with fuel and the other of said first and second manifolds is supplied with oxidizer, wherein a first portion of said first plurality of injectors are connected to said first manifold and a second portion of said first plurality of injectors are connected to said second manifold, and wherein said second plurality of injectors are connected to said second manifold.

19. A rocket engine as defined in claim 18, wherein said first portion of said first plurality of injectors and said second portion of said first plurality of injectors alternate in an essentially concentric circular array.

20. A rocket engine as defined in claim 18, wherein said first plurality of injectors are directed toward said peripheral wall of said precombustion chamber at locations thereupon which are adjacent to said annular step.

21. A rocket engine comprising:

a precombustion chamber having a first end and a second end, said precombustion chamber being defined by a peripheral wall extending between said first and second ends of said precombustion chamber and having a first inner diameter along a majority of said peripheral wall, said precombustion chamber being open at said first and second ends thereof, wherein at least the inner surface of said precombustion chamber is made of a material adapted to withstand the incompletely reacted products of combustion;

a main combustion chamber having a first end and a second end, said main combustion chamber being defined by a peripheral wall extending between said first and second ends of said main combustion chamber and having a second inner diameter which is larger than said first inner diameter, said main combustion chamber being open at said first and second ends thereof, wherein said main combustion chamber is made of a material adapted to withstand the temperatures associated with the completely reacted products of combustion;

an annular step interconnecting said second end of said precombustion chamber and said first end of said main combustion chamber into a combustion chamber assembly, said first end of said precombustion chamber and said second end of said main combustion chamber extending in opposite directions, the inner diameter of said combustion chamber assembly stepping suddenly from said first inner diameter in said precombustion chamber to said second inner diameter in said main combustion chamber at the location of said annular step;

an injector manifold assembly connected to said precombustion chamber at said first end thereof, said injector manifold assembly comprising a first plurality of injectors for directing a fuel and an oxidizer toward said main combustion chamber to form a propellant main core flow through said precombustion chamber, said injector manifold assembly further comprising a second plurality of injectors for directing at least one of the fuel and the oxidizer to form an annular peripheral cooling flow pattern adjacent the interior surface of said precombustion chamber; and a convergent and throat section located at said second end of said main combustion chamber, said convergent and throat section having an exhaust nozzle extending therefrom as a continuation of said throat section.

22. A rocket engine comprising:

a precombustion chamber having a first end and a second end, said precombustion chamber being defined by a peripheral wall extending between said first and second ends of said precombustion chamber and having a first inner diameter;

a main combustion chamber having a first end and a second end, said main combustion chamber being defined by a peripheral wall extending between said first and second ends of said main combustion chamber and having a second inner diameter which is larger than said first inner diameter, said second end of said precombustion chamber being interconnected to said first end of said main combustion chamber to define a combustion chamber assembly the inner diameter of said combustion chamber assembly stepping suddenly from said first inner diameter in said precombustion chamber to said second inner diameter in said main combustion chamber;

an injector manifold assembly connected to said precombustion chamber at said first end thereof, said injector manifold assembly comprising a first plurality of injectors for defining a propellant main core flow of fuel and oxidizer through said precombustion chamber and a second plurality of injectors for defining an annular peripheral cooling flow pattern adjacent the interior surface of said precombustion chamber of fuel or oxidizer; and a convergent and throat section located at said second and of said main combustion chamber, said convergent and throat section having an exhaust nozzle extending therefrom as a continuation of said throat section.

23. A method of making a rocket engine comprising:

defining a precombustion chamber having a first end and a second end with a peripheral wall which extends between said first and second ends of said precombustion chamber, said precombustion chamber having a first inner diameter along a majority of said peripheral wall and being open at said first and second ends thereof;

defining a main combustion chamber having a first end and a second end with a peripheral wall which extends between said first and second ends of said main combustion chamber, said main combustion chamber having a second inner diameter which is larger than said first inner diameter, said main combustion chamber being open at said first and second ends thereof;

interconnecting said second end of said precombustion chamber and said first end of said main combustion chamber with an annular step extending therebetween to form a combustion chamber assembly, said first end of said precombustion chamber and said second end of said main combustion chamber extending in opposite directions, the inner diameter of said combustion chamber assembly stepping suddenly from said first inner diameter in said precombustion chamber to said second inner diameter in said main combustion chamber at the location of said annular step; and connecting an injector manifold assembly to said precombustion chamber at said first end thereof, said injector manifold assembly comprising a first plurality of injectors for directing a fuel and an oxidizer toward said main combustion chamber to form a propellant main core flow through said precombustion chamber, said injector manifold assembly further comprising a second plurality of injectors for directing at least one of the fuel and the oxidizer to form an annular peripheral cooling flow pattern adjacent the interior surface of said precombustion chamber.

24. A rocket engine comprising:

a precombustion chamber having a first end and a second end, said precombustion chamber being defined by a peripheral wall extending between said first and second ends of said precombustion chamber and having a first inner diameter;

a main combustion chamber having a first end and a second end, said main combustion chamber being defined by a peripheral wall extending between said first and second ends of said main combustion chamber and having a second inner diameter which is larger than said first inner diameter; and an annular step interconnecting said second end of said precombustion chamber and said first end of said main combustion chamber into a combustion chamber assembly, said first end of said precombustion chamber and said second end of said main combustion chamber extending in opposite directions, the inner diameter of said combustion chamber assembly stepping suddenly outward from said first inner diameter in said precombustion chamber to said second inner diameter in said main combustion chamber at the location of said annular step;

wherein at least the inner surface of said precombustion chamber is made of a material having a high degree of thermal conductivity.

25. A rocket engine comprising:

a precombustion chamber having a first end and a second end, said precombustion chamber being defined by a peripheral extending between said first end and second ends of said precombustion chamber and having a first inner diameter;

a main combustion chamber having a first end and a second end, said main combustion chamber being defined by a peripheral wall extending between said first and second ends of said main combustion chamber and having a second inner diameterwhich is larger than said first inner diameter; and an annular step interconnecting said second end of said precombustion chamber and said first end of said main combustion chamber into a combustion chamber assembly, said first end of said precombustion chamber and said second end of said main combustion chamber extending in opposite directions, the inner diameter of said combustion chamber assembly stepping suddenly outward from said first inner diameter in said precombustion chamber to said second inner diameter in said main combustion chamber at the location of said annular step;

wherein said precombustion chamber is made of a material from the group consisting of the elements and alloys of nickel, platinum, rhodium, iridium, rhenium, beryllium, copper, and columbium.

26. A rocket engine as defined in claim 24, wherein said precombustopm chamber comprises:

an outer precombustion chamber sleeve having a first end and a second end, said second end of said outer precombustion chamber sleeve being interconnected to said first end of said main combustion chamber, said first end of said outer precombustion chamber sleeve being connected to an injector manifold assembly; and an inner precombustion chamber liner located inside and outer precombustion chamber sleeve closely adjacent to the inside of said outer precombustion chamber sleeve, the inside of said inner precombustion chamber liner defining said first inner diameter of said precombustion chamber, said inner precombustion chamber liner comprising said inner surface of said precombustion chamber.

27. A rocket engine as defined in claim 26, wherein said inner precombustion chamber liner is made of a material having a high degree of thermal conductivity.

28. A rocket engine as defined in claim 27, wherein said inner precombustion chamber liner is made of a material from the group consisting of platinum, platinum alloys with rhodium, iridium, iridium alloys with rhodium, niobium, nickel alloys, cobalt alloys, carbon, carbon composites, and silicone carbide.

29. A rocket engine as defined in claim 26, wherein a portion of said inner precombustion chamber liner extends partially into said main combustion chamber, said portion of said inner precombustion chamber liner which extends into said main combustion chamber ending abruptlyto cause the inner diameter of said combustion chamber assembly to step suddenly from said first inner diameter in said inner precombustion chamber liner to said second inner diameter in said main combustion chamber.

30. A rocket engine as defined in claim 26, wherein said second end of said outer precombustion chamber sleeve, said annular step, and said first end of said main combustion chamber are joined together by one of the techniques from the group consisting of welding and brazing, and wherein said first end of said outer precombustion chamber sleeve is joined to said injector manifold assembly by one of the techniques from the group consisting of welding and brazing.

31. A rocket engine as defined in claim 26, wherein said inner precombustion chamber liner is installed inside said outer precombustion chamber sleeve by one of the techniques from the group consisting of cladding, diffusion bonding, brazing, alloying, interference fitting, swaging and explosive forming and bonding.

32. A rocket engine as defined in claim 26, wherein said inner precombustion chamber liner is installed inside said outer precombustion chamber sleeve by placing an interface material that provides minimum thermal contact resistance intermediate said inner precombustion chamber liner and said outer precombustion chamber sleeve such that said interface material is re-melted or forced by a pressure load to displace any voide between said inner precombustion chamber liner and said outer precombustion chamber sleeve.

33. A rocket engine as defined in claim 26, wherein the outer diameter of said inner precombustion chamber liner and the inner diameter of said outer precombustion chamber sleeve are each tapered in similar fashion to fit together.

34. A rocket engine comprising:

a precombustion chamber having a first end and a second end, said precombustion chamber being defined by a peripheral wall extending between said first and second ends of said precombustion chamber and having a first inner diameter;

a main combustion chamber having a first end and a second end, said main combustion chamber being defined by a peripheral wall extending between said first and second ends of said main combustion chamber and having a second inner diameter which is larger than said first inner diameter, said main combustion chamber being open at said first and second ends thereof, and an annular step interconnecting said second end of said precombustion chamber and said first end of said main combustion chamber into a combustion chamber assembly, said first end of said precombustion chamber and said second end of said main combustion chamber extending in opposite dirctions, the inner diameter of said combustion chamber assembly stepping suddenly outward from said first inner diameter in said precombustion chamber to said second inner diameter in said main combustion chamber at the location of said annular step;

wherein said inner diameter of said precombustion chamber is substantially constant from said first end of said precombustion chamber to said second end of said precombustion chamber.

\* \* \* \* \*

UNITED STATES PATENT AND TRADEMARK OFFICE
CERTIFICATE OF CORRECTION

PATENT NO. : 6,397,580 B1
DATED : June 4, 2002
INVENTOR(S) : R.C. Stechman, Jr. et al.

It is certified that error appears in the above-identified patent and that said Letters Patent is hereby corrected as shown below:

<u>Title page,</u>
Item [75], Inventors, "santa Clarita;" should read -- Santa Clarita; --

Item [56], References Cited, U.S. PATENT DOCUMENTS, insert in appropriate order: -- 2,902,823  9/1959  Wagner --

Item [74], *Attorney, Agent or Firm*, delete "Chester E. Crone;" and "Kindess" should read -- Kindness --

<u>Column 5,</u>
Line 60, "EMBODIMENTS" should read -- EMBODIMENT --

<u>Column 13,</u>
Line 18, "diameter;" should read -- diameter along a majority of said peripheral wall; --
Line 27, "chamber assembly the" should read -- chamber assembly, the --

<u>Column 14,</u>
Line 46, "peripheral extending" should read -- peripheral wall extending --
Line 53, "diameterwhich" should read -- diameter which --

<u>Column 15,</u>
Line 4, "precombustopm" should read -- precombustion --
Line 11, "inside and" should read -- inside said --
Line 32, "abruptlyto" should read -- abruptly to --

<u>Column 16,</u>
Line 12, "voide" should read -- void --
Line 30, "thereof, and" should read -- thereof; and --

Signed and Sealed this

Tenth Day of December, 2002

JAMES E. ROGAN
*Director of the United States Patent and Trademark Office*